Oct. 25, 1932.  I. E. McCABE  1,884,045
ELECTRICALLY OPERATED FLUID FUEL BURNER CONTROL
Filed Jan. 6, 1930  5 Sheets-Sheet 1

INVENTOR
IRA. E. McCABE
BY Langdon Moore
ATTORNEY

Oct. 25, 1932.  I. E. McCABE  1,884,045

ELECTRICALLY OPERATED FLUID FUEL BURNER CONTROL

Filed Jan. 6, 1930  5 Sheets-Sheet 2

INVENTOR
IRA. E. McCABE
BY Langdon Moore
ATTORNEY

Oct. 25, 1932.   I. E. McCABE   1,884,045
ELECTRICALLY OPERATED FLUID FUEL BURNER CONTROL
Filed Jan. 6, 1930   5 Sheets-Sheet 3

INVENTOR
IRA. E. McCABE
BY Langdon Moore
ATTORNEY

Oct. 25, 1932.   I. E. McCABE   1,884,045
ELECTRICALLY OPERATED FLUID FUEL BURNER CONTROL
Filed Jan. 6, 1930   5 Sheets-Sheet 4

INVENTOR
IRA. E. McCABE
BY Langdon Moore
ATTORNEY

Oct. 25, 1932.    I. E. McCABE    1,884,045
ELECTRICALLY OPERATED FLUID FUEL BURNER CONTROL
Filed Jan. 6, 1930    5 Sheets-Sheet 5

Fig 6

INVENTOR
IRA. E. McCABE
BY
Langdon Moon
ATTORNEY

Patented Oct. 25, 1932

1,884,045

UNITED STATES PATENT OFFICE

IRA E. McCABE, OF CHICAGO, ILLINOIS

ELECTRICALLY OPERATED FLUID FUEL BURNER CONTROL

Application filed January 6, 1930. Serial No. 418,684.

This invention relates to improvements in electrically operated liquid fuel burner controls such as are employed for automatically controlling the operation of oil burners for domestic heating purposes.

At the present time the customary commercial oil burner as applied to domestic heating plants includes certain safety appliances. The motor for operating the oil burner is connected to the commercial electric lighting circuit of the dwelling or building, with various controls and safety devices interposed in the circuit between the motor and the source of electricity. A room thermostat, located in the most convenient place where an even temperature is desired, so that when the temperature falls below the desired degree the motor circuit will be closed and when it ascends above the desired degree, the motor circuit will be broken. In the motor circuit between the room thermostat and the motor a boiler control is usually interposed which is controlled by the temperature of a hot air or hot water heating system, in which the motor circuit is normally closed and which will operate, should the temperature or pressure aproach the danger point, to break the motor circuit. It is also customary to supply a safety device which normally closes the motor circuit and is so constructed that should the room thermostat call for heat the motor will start to supply oil to the burner and at the same time an ignition device will be operated to ignite the oil, but should the flame fail to ignite for any reason, a predetermined time thereafter, the motor circuit will be broken, or should the flame after ignition fail the motor circuit will be broken. It is to this latter type of device that this invention relates.

Many parts of this device have been heretofore disclosed and described by this applicant in his pending applications which will be referred to by serial numbers as the respective parts are described.

It is an object of this invention to provide a control of this character which is simple in construction and so compact that it may be contained in the casing of the commercial stack safety. In carrying out this object, this device includes a switch in the motor circuit, hereinafter called the "motor switch", which is releasably held in closed position by a bi-metallic catch, actuated by an electric thermal element, hereinafter called the "heat coil", located in the motor circuit between the motor switch and motor and a second switch located in the motor circuit between the motor switch and the far side of the heating element, adapted when closed to shunt out the heating element, hereinafter called the "shunt switch", which shunt switch is actuated by the operation of the thermal element of the stack safety, usually mounted upon the stack of the furnace with a thermal element extending therein responsive to the presence or absence of the heat of the ascending gases from the combustion of the oil in the combustion chamber of the furnace. This construction broadly is disclosed in this applicant's co-pending application Serial No. 19310, filed March 30, 1925, entitled "Electric circuit controls".

This present invention is designed so that when the temperature in the room has caused the room thermostat to open the motor circuit, whereby the furnace becomes cold, the motor switch will assume the closed position, and the shunt switch will assume the open position. This invention also contemplates an ignition circuit controlled by this device and under the above conditions the ignition switch will assume the closed position. When the temperature of the room closes the room thermostat, the motor switch and ignition switch being closed, the motor begins to operate and the ignition device will ignite the oil, and under normal operation the stack safety will close the shunt switch and open the ignition switch, and the burner will continue to operate until the room thermostat breaks the motor circuit. When this occurs, the parts return to their normal cold position.

Should the room thermostat close the motor circuit and the fuel fail to ignite, the stack safety will not close the shunt switch and the heating coil will release the motor switch to break the motor circuit, and the motor will stop; and the burner will not operate again until the device is manually reset to close both motor and ignition switches.

Should the room thermostat close the motor circuit and the flame fails after it has been ignited, the stack safety opens the shunt circuit, the heat coil releases the motor switch to open and the ignition switch is released to assume the closed position but the burner will not operate again until the motor switch is manually reset.

Should there be a current interruption or temporary failure of power from the commercial line during the normal operation of the burner, the motor will stop and thereafter the motor switch will be allowed to open, the stack safety will return the shunt switch to open position, the ignition switch to the closed position and the motor switch to closed position so that upon current resumption the motor will immediately begin operating without the necessity of manually resetting the device.

A device of this same general character was disclosed in this applicant's application, Serial 311,437, filed October 10, 1928, entitled "Control for electrically operated fuel burner devices", now Patent No. 1,817,635, granted Aug. 4, 1931, which prior pending application discloses a device which will automatically recycle in case of current interruption and upon failure of flame after ignition, but requires manual resetting in case of ignition failure, whereas in the present application, this device will automatically recycle only upon current interruption and must be manually reset in case of ignition failure and in case of flame failure after ignition. This device also differs from said prior co-pending application in that, in said prior application the circuit closed by the room thermostat is required to flow through a preheating element for a predetermined time before the safety features become operative, while in the present application the safety features become operative upon the closing of the room thermostat. The only feature which is common to both this device and that of said prior application is, that when through abnormal action the ignition switch having once assumed the open position, the motor must be stopped before the ignition switch can be closed.

With these and other objects in view reference is made to the accompanying sheets of drawings, which illustrate a preferred form of this invention, with the understanding that minor detail changes may be made without departing from the scope thereof.

The embodiment of this invention, as illustrated upon the drawings, includes a commercial stack safety comprising a casing base plate 1 having a removable cover 2 attached upon one side thereof and a tubular member 3 extending from the other side. One end of a bi-metallic helix 4 is secured to the extremity of the tubular member 3, the other end of which is secured to an operating shaft 5 axially mounted within the helix and tubular member 3 passing through a bearing provided therefor in the base plate 1. This is a commercial structure and tubular member 3 is customarily provided with means for securing the same to the stack of a furnace to support the casing upon the exterior of the stack with the thermal bi-metallic element extending into the interior of the stack. This construction being well-known in this art, it is not thought necessary to illustrate the same herein. The bi-metallic thermal element 4 is responsive to the presence or absence of heat within the stack, and expanding and contracting in response thereto will impart a rotative movement to the operating shaft 5. While there are various devices of this character upon the market to apply this movement of the operating shaft for tilting a mercury tube switch to make and break a circuit therethrough, it is preferred to employ in this instrument the mechanism disclosed in this applicant's prior application 311,436, filed Oct. 10, 1928, entitled "Thermostatically actuated electric switches".

Figure 1:
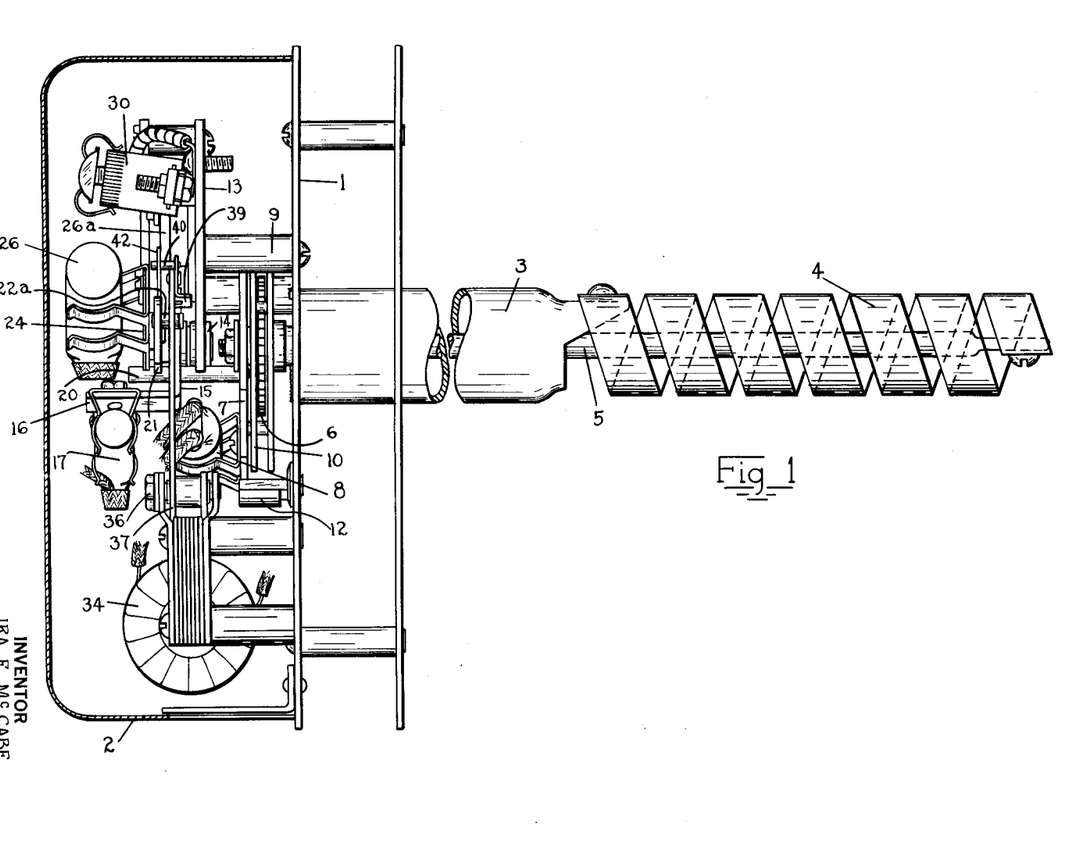
Figure 1 is a view in side elevation of a commercial type of stack safety with the cover of the casing shown in section, illustrating a preferred form of this invention mounted within said casing in side elevation, with parts broken away.
Figures 2, 8, 9, 10, 11:
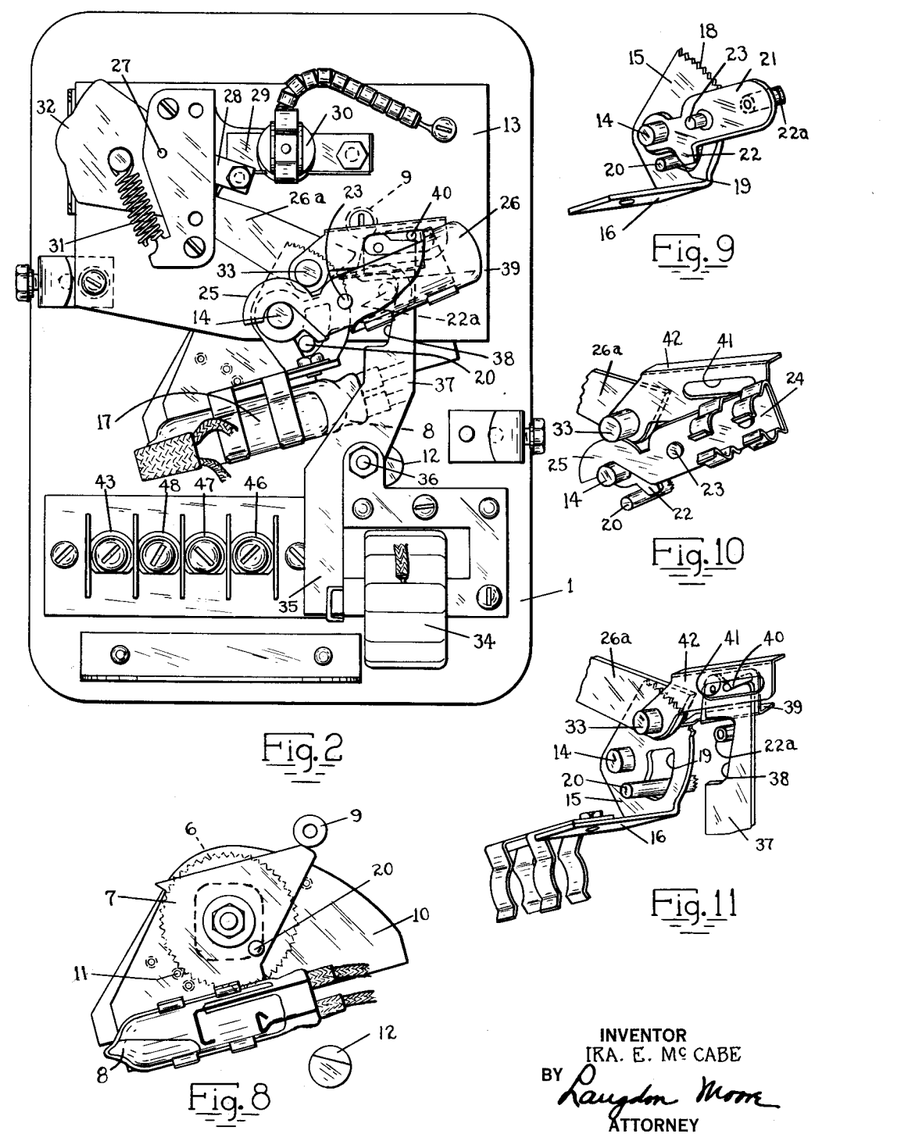
Figure 2 is a view in front elevation of the stack safety casing, with the cover removed, illustrating this preferred form with the parts in the positions assumed when the furnace is cold and before the room thermostat closes the motor circuit.
Figure 8 is a detail view in front elevation of the stack safety actuated mechanism carrying the shunt switch with the switch in open position.
Figure 9 is a detail view in perspective of the ignition switch carrier plate, pivot post therefor, plate mounting motor switch carrier, plate pivot, and post for moving both plates.
Figure 10 is a detail view in perspective illustrating the relation of the plate mounting the motor switch carrier, plate pivot, the pivot post for said plate, the motor switch carrier plate, the end of the latch with the stud thereon pivotally mounting the slotted plate, and the post for moving said first named plate.
Figure 11 is a fragmentary detail view illustrating the relation of the ignition switch carrier plate, its pivot post, the post for moving said plate, the end of the latch, the end of the armature arm mounting the pivoted pawl with the post extending from the pawl passing through the slotted plate pivoted upon the stud on the latch.

This thermostatically actuated switch mechanism, as shown in Figures 1 and 8, briefly includes a toothed disc 6 mounted upon and rotatable with the operating shaft 5 upon the interior of the casing, a pivoted carrier plate 7 rotatably mounted upon the shaft 5 having clips to engage and support a mercury tube switch 8 and having a projection adapted to engage a fixed portion 9 of the casing to limit its rotation in one direction, and a gravity actuated plate 10 pivotally connected thereto with a roller 11 mounted thereon to be received between the teeth of the disc 6. The weight of the other extremity of the pivoted roller carrying plate 10 adapted to normally position the roller between the teeth of the disc 6 whereby rotation of the shaft 5 in one direction initially rotates the carrier plate in the same direction until the projection upon the plate engages the stationary member 9 upon the casing and a continued rotation of the shaft 5 the same direction causes the toothed disc 6 to travel under the roller. Initiate movement in reverse rotation of the shaft 5 simultaneously imparts initial rotation of the carrier plate 7 in the reverse direction, until the roller carrier plate 10 engages a fixed stop 12 upon the casing and thereafter on further rotation the toothed disc will travel under the roller.

A supporting plate 13 is mounted upon the upper portion of the base plate 1 and spaced apart from the thermostatically actuated switch operating mechanism. This plate mounts a post 14 upon which a switch carrying plate 15 is rotatably mounted. This plate is provided with a right-angular extension 16 having clips attached thereto for supporting upon the under side thereof a mercury tube switch 17. The upper portion of this plate is formed on the arc of a circle of which the center is the center of the post 14 and this curved upper portion is provided with a plurality of teeth 18. The portion of the plate 15 adjacent the right-angular extension is provided with a cut-away portion 19. The relation of the post 14 with the center of the rotatable operating shaft 5 of the stack safety mechanism is such that a post 20 mounted upon the switch carrying plate 7 of the stack safety mechanism will pass through the aperture 19 in the plate 15 and upon rotation in one direction of the plate 7 will impart a similar rotation in the same direction of plate 15, and the aperture 19 is of sufficient size to allow a movement of the post 20 in the opposite direction until limited by the stop 9 without engagement with the body of the plate 15.

The post 14 also pivotally mounts at one end an elongated plate 21 having a depending projection 22 extending in the path of the travel of the post 20. The free end of this plate mounts a roller 22ª extending in the direction of the base plate 1 at a greater distance from the center of the post 14 than the toothed portion 18 of the plate 15. The plate 21 mounts intermediate its pivotal point and the roller 22ª a pivot post 23 upon which is pivotally mounted a switch carrying plate 24 having a curved projection 25 adapted to detachably engage the post 14 and when in such engagement to maintain the switch carrying plate 24 substantially in parallel relation to the supporting plate 21. The switch carrying plate 24 is provided with clips to engage and support a mercury tube switch 26.

At the upper lefthand portion of plate 13 a spring pressed latch member 26ª is rotatably mounted upon a pivot 27 having an extension 28 adapted when rotated in one direction to be engaged and held against counter rotation by the extremity of a bi-metallic element 29 which element is secured at its opposite end to the supporting plate 13. This bi-metallic element mounts an electrical heating element 30 whereby when heat is imparted to the strip 29, the strip will be caused to deform and release the catch 28, to allow the latch to be rotated by the coil spring 31 in the opposite direction. The particular construction of the bi-metallic strip 29 and electrical heating element 30 is illustrated and described in this applicant's prior Patent No. 1,648,390 dated November 8, 1927, for "safety switch mechanism." The outer end of the latch 26 is provided with a knob 32 normally extending through the side of the casing whereby when the thermal strip 29 has released the latch it may be manually rotated in the opposite direction to again engage the strip 29 when it has cooled. The inner extremity of the latch 26ª is provided with a stud 33 so located that when the curved portion 25 of the switch supporting plate 24 is in engagement with the post 14, this stud 33 will engage the upper portion of 25 and allow rotation of this portion between the stud 33 and the post 14, when the latch is held in its lowermost position by engagement with the bi-metallic strip 29 and when the bi-metallic strip has released the latch the stud 33 will be moved upward and allow the weight of the mercury tube switch 26 to rotate the switch carrying plate 24 about its pivot 23, away from the post 14.

At the lower righthand corner of the base plate 1 is mounted an electrical magnet 34 having an armature 35 mounted on a pivot 36 above the magnet which armature is provided with an arm 37 extending upwardly and at the rear of the plate 21 and approximately in the same plane with the latch 26ᵃ. The inner portion of the arm 37 is provided with a cut-away angular track 38 adapted to be engaged by the roller 22ᵃ of the plate 21 pivoted upon the post 14. The upper and inward extremity of the arm 37 pivotally mounts a weighted pawl 39 which, when the magnet is energized to attract the lower end of the armature, will engage the toothed segment of the plate 15. The body of the pawl is extended to the right of its pivot point, and is provided with a post 40 extending over the upper end of the arm 37 and adapted to pass through a slot 41 in a plate 42 pivotally mounted upon the stud 33 of the latch 26ᵃ. The upper edge of this plate is provided with a right-angular flange passing over the upper edge of the latch 26ᵃ and normally out of engagement therewith but adapted when the latch 26ᵃ is released and moves upwardly to be engaged on the under side of the flange to lift the plate 42 with the latch 26ᵃ causing the post 40 passing through the slot 41 in the plate 42 to be lifted upward with the plate 42 to cause the pawl 39 to be rotated about its pivot away from the toothed segment of plate 15.

The mercury tube switch 8 mounted upon the carrier plate 7 is caused to open and close by the operation of the thermal element of the stack safety mechanism and is hereinafter referred to as the "shunt switch." The mercury switch 17 carried on the plate 15 is caused to rotate about the post 14 to open and close and is hereinafter referred to as the "ignition switch." The mercury tube switch mounted upon the plate 24 and rotatable about the pivot 23 to open and close is hereinafter referred to as the "motor switch." Upon the lower portion of the base plate 1 to the left of the electromagnet is mounted a series of four insulated binding posts. Referring to the wiring diagram in Figure 7 it will be seen that the incoming current from the commercial line passes through the room thermostat "T" through the boiler control "B" to binding post 43, and from thence through the motor switch 26 to the binding post 44 upon the bi-metallic strip 29. Here the current branches, part of it passing through the bi-metallic strip and heating coil 30 to the binding post 45, and the other part passes from binding post 44 through the shunt switch 8 to the binding post 45, when said shunt switch closes to shunt out the heating coil 30. The current passes from binding post 45 through electromagnet 34 to binding post 46 and from thence through binding post 47 to the motor "M" and back to the commercial line. When the shunt switch 8 is open and the ignition switch 17 is closed, part of the current branching from binding post 44 passes through the ignition switch 17 to the binding post 48, and from thence through the ignition device "I" back to the commercial line.

Figure 7:
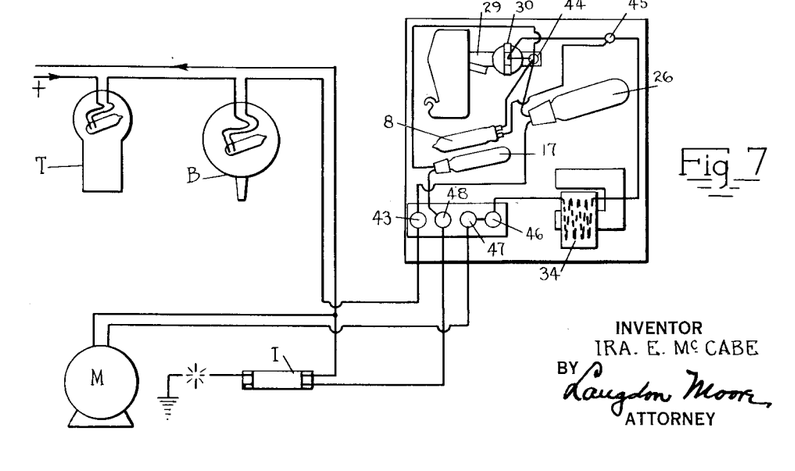
Figure 7 is a wiring diagram illustrating the application of this improved control in the customary oil burner motor circuit, in which the parts of this control are diagrammatically indicated in the same position as shown in Figure 2.

From this wiring diagram it is readily seen that when the motor switch is in closed position with the shunt switch in open position and the ignition switch in closed position, as shown in said diagram, and the circuit is closed through the room thermostat, the current will pass through the motor switch to binding post 44 and a portion of the current will then pass through the ignition switch to operate the ignition device, and the other portion will pass through the heating element and electromagnet to operate the motor. As heretofore described, if the shunt switch is not operated by the thermal element of the stack safety mechanism to close the motor circuit therethrough and shunt the current passing through the heating element, the bi-metallic strip 29 will deform and release the latch 26ᵃ. The releasing of the latch 26ᵃ will cause the motor switch to break the motor circuit, as will be hereinafter described. If the thermal element 4 of the stack safety closes the shunt switch 8 the motor circuit will remain closed. It is to be noted that the magnet 34 is in series in the motor circuit between the binding post 45 and motor and therefore will always be energized whenever the motor operates, and will cause the armature 35 to hold the armature arm 37 at the end of its movement in that direction, for the purpose hereinafter described.

Referring to Figure 2 of the drawings, the relations of the parts heretofore described is such that when the room thermostat has opened the motor circuit and the combustion chamber cooled, the various parts will assume the position shown in this figure. The thermal element 4 of the stack safety having cooled will rotate the operating shaft 5 to actuate the carrier plate 7 to rotate the shunt switch 8 to open position, as shown in Figure 2, and as shown in detail in Figure 8. As the carrier plate 7 assumes this position, the post 20 carried thereon will be moved to the right through the aperture 19 in the ignition switch carrying plate 15 and the weight of the ignition switch 17 rotates the plate 15 so that the lefthand edge of the slot 19 engages the lefthand side of the post 20. The righthand side of the post 20, as the carrier plate 7 rotates to the right, engages the depending projection 22 of the plate 21 and rotates it about the post 14 to the position shown. The latch 26ª having been rotated manually by the hand reset knob 32 to be engaged by the bi-metallic plate 29 has depressed the stud 33 to engage the upper surface of the curved member 25 of the carrier plate 24 of the motor switch 26 so that it will assume the position illustrated in Figure 2. The armature 35 and the armature arm 37 are so balanced upon the pivot 36 as to allow the weight of the plate 42 resting upon the post 40 passing through the slot 41 to rotate the pawl 39 to engage the toothed segment 18 upon an ignition switch carrier plate 15. These positions are the same as those illustrated in the wiring diagram of Figure 7.

Upon closing the circuit through the room thermostat the current immediately passes, as hereinbefore described, from the line through the motor switch and magnet 34 to the motor. The starting of the motor will supply oil to the combustion chamber and at the same time a portion of the current is passing through the ignition switch to the ignition device whereby the fuel is ignited. A portion of the current is also passing through the heating element 30 upon the bi-metallic strip 29, holding the latch 26ª in place. The energizing of the magnet 34 immediately attracts and holds the armature 35 against it, whereby the armature arm 37 and the pawl 39 carried thereby are held in the position shown in Figure 2. In this position the angular track 38 upon the armature arm 37 engages the roller 22ª which prevents rotation of the plate 21 about the post 14 when the post 20 moves away from the depending projection 22, and thereby holds the motor switch in closed position. As long as the motor is operating the magnet holds the armature arm in this position and, therefore, will hereinafter be referred to as the "holding magnet."

Figures 3, 4, 12:
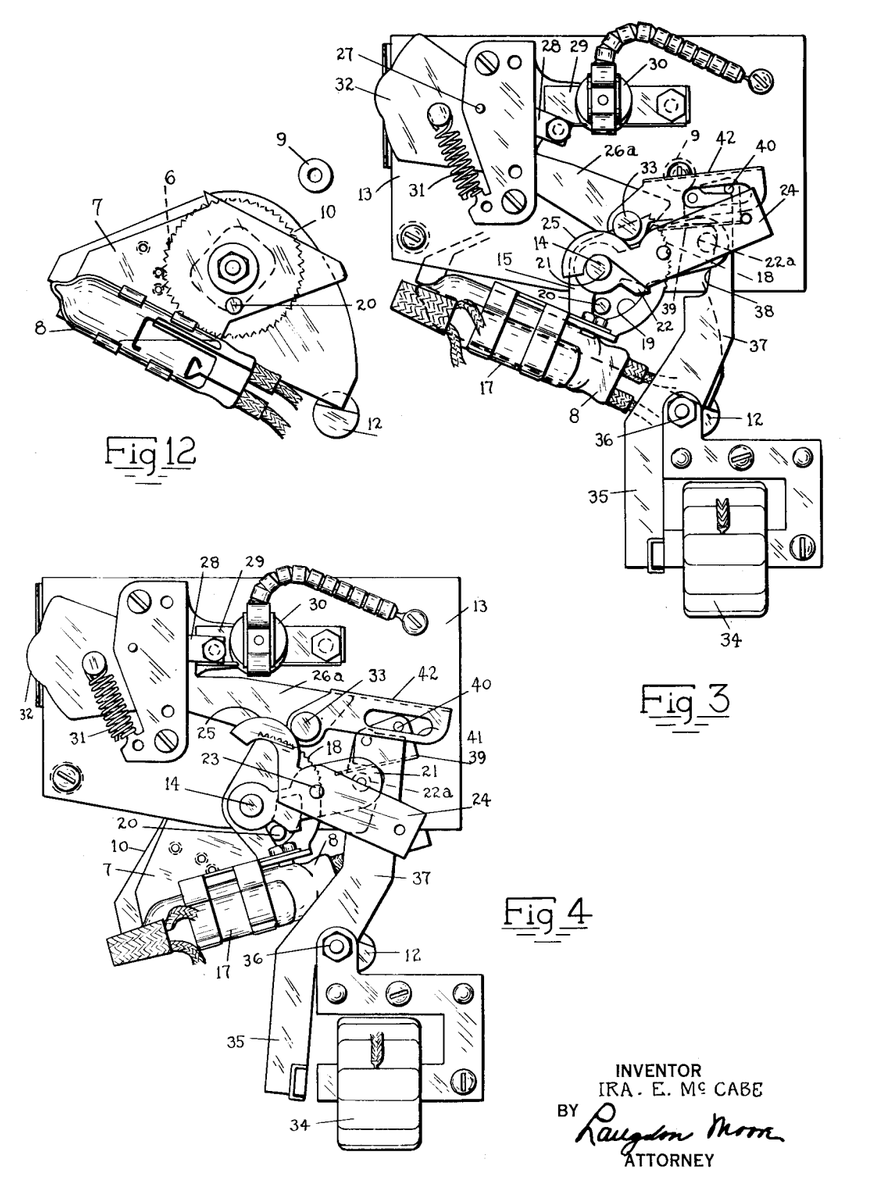
Figure 3 is a detailed view of the operating parts of this device similar to that of Figure 2 illustrating the position assumed when the room thermostat has closed the motor circuit and the burner is operating under normal conditions.
Figure 4 is a view similar to Figure 3 illustrating the position assumed by the parts when the room thermostat has closed the motor circuit and for some reason or other the fuel has failed to ignite.
Figure 12 is a view similar to Figure 8 illustrating the shunt switch in closed position.

After the ignition device ignites the oil, combustion occurs in the combustion chamber and the heat of the gases passing upward therefrom through the stack will cause the thermal element 4 of the stack safety to rotate the operating rod 5 in the direction to cause the carrier plate 7 to rotate the shunt switch 8 into the closed position, as shown in Figures 3 and 12, whereby the heating element 30 is shunted out. The rotation of the carrier plate 7 causes the stud 20 carried thereon to engage the ignition switch carrier plate 15 and rotate it therewith to move the ignition switch 17 to the open position to break the circuit through the ignition device "I". During this movement the toothed segment 18 of the carrier plate 15 travels under the pivoted pawl 39 upon the upper end of the armature arm 37 and is locked by the pawl 39 against counter-revolutions. This is the normal running position in which the burner is operating in its normal manner, and in this position the shunt switch is closed and the ignition switch is open, the motor switch is closed and the current from the commercial line passes through the motor switch and through the holding magnet to operate the motor, as shown in Figure 3.

Figure 5:
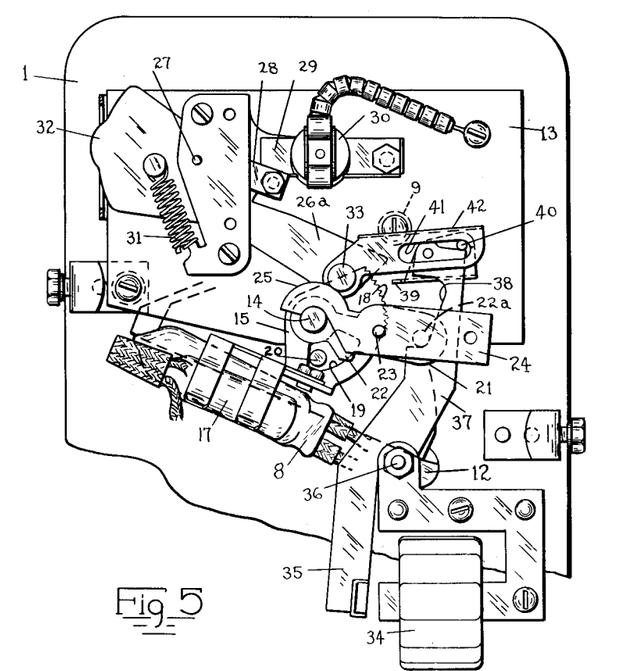
Figure 5 is a view similar to Figure 2 illustrating the position assumed by the parts when the room thermostat has closed and, during the normal operation of the burner, there has been an interruption of the current.

When, during the normal operation of the burner, the room thermostat opens and breaks the motor circuit, the holding magnet 34 is immediately deenergized, the burner flame immediately ceases, the combusion chamber cools; and the thermal element 4 of the stack safety imparts a reverse movement through the operating shaft 5, to the carrier plate 7 thereby returning the shunt switch 8 to its open position, which at the same time returns the post 20 to the position shown in Figure 2. The holding magnet having released the armature 35 allows the roller 22ª to travel down the incline track 38 forcing the withdrawal of the pawl from the toothed segment 18 of the ignition carrier plate 15 and open the motor switch, as shown in Figure 5, whereupon the ignition switch returns to closed position, as the thermal element 4 cools. The cooling of the stack safety thermal element 4 causes the carrier plate 7 to return to the position shown in Figure 8 during which movement the post 20 engages the depending projection 22 to return and hold the plate 21 and likewise return and hold the motor switch 26 in its closed position. The parts being so returned from running or normal burner operating position to the cold or normal non-operating position, as shown in Figure 2, when the room thermostat again normally closes the parts will again pass through the normal cycle, as just described.

Should, during the running or normal burning of the burner, there be a current interruption or a temporary cessation of power, as when the commercial line breaks, the parts will pass through the same cycle as if the room thermostat has normally operated to shut down the burner so that upon current resumption the parts are caused to pass through the normal cycle the same as if the room thermostat had normally closed to start the operation of the burner, as hereinbefore described.

Having described the normal operation of this device in starting and stopping the burner by the normal opening and closing of the room thermostat as well as the operation under unusual or abnormal stoppage of the motor by an interruption in the line current, there remains two conditions which may occur from time to time which create a dangerous situation and over which the owner of the oil burner has no control. These conditions are considered abnormal. It is always presumed that there will be a sufficient supply of fuel for the burner yet if this supply becomes exhausted or if for any other reason the burner flame becomes extinguished during the normal running of the burner, the motor will run indefinitely. At times the burner flame becomes extinguished by a particle of foreign matter clogging up the nozzle or by an air pocket forming in the fuel so that the fuel will be interrupted in its flow through the nozzle and in such cases should the fuel supply be resumed while the combustion chamber is still hot, an explosion may take place.

This device contemplates the shutting down of the burner upon failure of ignition and upon failure of the flame after ignition in the following manner. Should the fuel fail to ignite when the room thermostat closes the motor circuit, the closing of the motor circuit immediately energizes the holding magnet 34 which holds the angular track 38 on the armature arm 37 in engagement with the roller 22ª upon the plate 21, holding the motor switch 26 in the position shown in Figure 2, however, since there is no combustion of the fuel to act upon the thermal member 4 of the stack safety, the shunt switch and, therefore, the ignition switch remain in their normal positions as shown in Figure 2, with the shunt switch open and the ignition switch closed. The shunt switch 8 remaining open, after a predetermined time, causes the current passing through the motor switch 26 and heating element 30 to the motor to deform the bi-metallic strip 29 to release the catch 28 of the latch 26ª whereupon the spring 31 causes the latch to be rotated about its pivot 27 lifting the stud 33 away from the curved member 25 of the motor switch carrying plate 24, whereupon the motor switch 26 by its weight will rotate the plate 24 about the pivot 23 until the motor switch is opened, as shown in Figure 4, whereupon the holding magnet will be deenergized and the lifting action of the end of the latch 26ª will lift the plate 42 causing the bottom of the slot 41 to engage the post 40 of the pawl 39 pivoted on the armature arm 37 causing the pawl to be rotated about its pivot to disengage the toothed segment 18, as shown in Figure 4. The post 20 engaging projection 22 does not move so that plate 21 remains in the position shown in Figure 2. In this manner the motor circuit is broken and the breaking of the motor circuit also breaks the ignition circuit, whereupon the heating element 30 will cool and the bi-metallic strip 29 will assume its normal position. After an ignition failure it is impossible for the motor to again operate until the device is manually reset.

To reset the device manually the knob 32 extending through the side of the casing from the latch 26ª is moved upwardly causing the stud 33 to be depressed and the stud 33 engaging the curved portion 25 will return this portion to engage the post 14; at the same time the catch 28 wipes over and is engaged by the bi-metallic strip 29 to lock it against the tension of the spring 31. In returning and holding the curved member 25 in contact with the post 14, the motor switch carrier plate 24 is rotated about its pivot 23 to close the motor circuit switch, as shown in Figure 2. The downward movement of the post 33 on the latch 26ª depresses the end of the plate 42 pivoted thereon which allows the pawl 39 to assume the position shown in Figure 2. The ignition and shunt switches having remained in the position shown in Figure 2, upon a manual reset, the other parts are returned to the normal cold position whereby the burner may be again operated upon the closing of the room thermostat.

Figure 6:
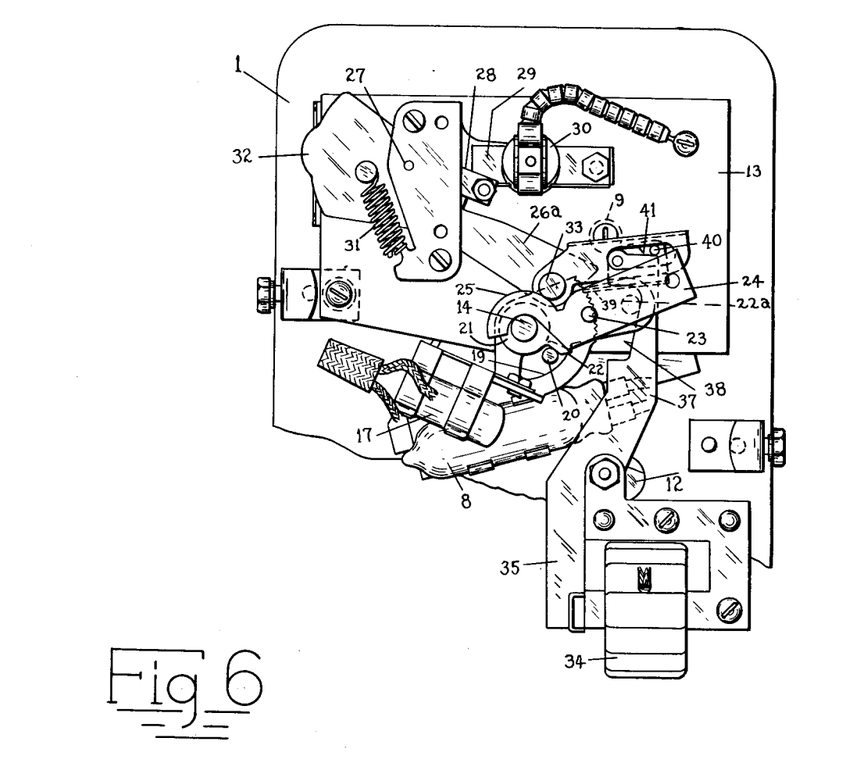
Figure 6 is a view similar to Figure 3 illustrating the position assumed by the parts when the room thermostat has closed and, during the normal operation of the burner, the burner flame for some reason or other has become extinguished, or failed.

In case the burner flame should fail after it has been ignited and the parts of this device have assumed normal running position as shown in Figure 3, the motor circuit will still pass through the motor switch and holding magnet 34. In this position the pawl 39 is held in engagement with the toothed segment 18 upon the ignition switch carrying plate and holds the ignition switch in the open position as shown in Figures 3 and 6. As there is no further combustion of the fuel in the combustion chamber the stack safety gradually cools and the thermal element 4 will cause the shunt switch to rotate to the open position, as shown in Figures 6 and 8. The opening of the shunt switch will, after a predetermined time, cause the release of the latch 26ª by deforming the bi-metallic strip 29 whereupon the motor circuit will be broken, as just above described and the parts will assume the position as shown in Figure 4, and will require to be manually reset before the burner can again operate.

It is seen that in this device upon any abnormal occurrence the burner motor is shut down and the device must be manually reset before the burner can again operate. The temporary interruption of the commercial line current automatically shuts down the burner in the same manner as though a breaking of the motor circuit through the room thermostat occurred and, therefore, the parts will return to their normal cold position so that upon the resumption of the current the motor can be again operated in the same manner as by the normal closing of the room thermostat, however, in case of a current interruption, the slightest interruption, or the instant the line circuit fails, the holding magnet 34 becomes de-energized, breaking the motor circuit which cannot again be closed until after the stack safety has cooled and returned the parts to their normal cold position as shown in Figure 2. In the case of a current interruption, it may be said this device is automatically recycled.

If, in the installation of this control on the job, the workman secures it in place out of alignment with the vertical to such a degree that it cannot function normally, the parts are so constructed and arranged that it fails on the safe side, that is, the motor circuit either cannot be closed or, if closed, the motor switch latch is tripped and the motor circuit is broken. If the control is tilted abnormally in one direction, the mercury in the motor, shunt and ignition switches will flow to open the motor and ignition circuits while the shunt circuit is closed so that if the room thermostat calls for heat there can be no operation of the burner and, if the control is tilted abnormally in the opposite direction, the shunt switch cannot be swung sufficiently to close the shunt circuit so that should the room thermostat call for heat the motor circuit passing through the heating element 30 releases the latch 26ª and the motor switch opens the circuit after a predetermined time. Furthermore, if the bi-metallic thermal element 4 becomes consumed or burnt up by excessive heat from the burner flame, as sometimes occurs, the parts 6 to 12 are so constructed and arranged that, in such event, the shunt switch automatically moves to open position, as described in my said prior application Serial No. 311,436, filed October 10, 1928, and the latch is released by the heating element to open the motor switch.

What I claim is:

1. An electrically operated fluid fuel burner control included in the electric circuit operating the fuel feeding motor, said control including a motor switch, a holding magnet, both connected in series in the circuit between the motor and source of electricity, and an ignition device having a switch connected in parallel with the motor, a reset latch for closing the motor switch, thermally actuated means responsive to the presence or absence of the burner flame, which when cold allows the ignition switch to close and cooperates with the reset latch to allow a manual closing of the motor switch, means actuated by the energization of the holding magnet to hold the motor switch in closed position, said thermally actuated means when heated by the burner flame opens the ignition switch, and locking means actuated by the energization of the holding magnet for holding the ignition switch open, said holding and locking means actuated by the holding magnet acting when the magnet is deenergized to unlock the ignition switch and release the motor switch to open independently of the latch, and means carried by said thermally actuated means in moving from hot to cold position normally to engage and return the motor switch to closed position independently of the latch.

2. An electrically operated fluid fuel burner control included in the electric circuit operating the fuel feeding motor, said control including a motor switch, and a holding magnet both connected in series in the circuit between the motor and source of electricity, and an ingnition device having a switch connected in parallel with the motor, a reset latch for closing the motor switch, thermally actuated means responsive to the presence or absence of the burner flame, which when cold allows the ignition switch to close, said means cooperating when cold with the reset latch to allow a manual closing of the motor switch, means actuated by the energization of the holding magnet cooperating with the closed latch to hold the motor switch in closed position, said thermally actuated means when heated by the burner flame opens the ignition switch, and locking means actuated by the energization of the holding magnet for holding the ignition switch open until the holding magnet is deenergized, said thermally actuated means responsive to the burner flame cools after the breaking of the motor circuit and, in assuming its cold position, gradually allows the ignition switch to close and, at the same time, causes the motor switch to return to closed position when the reset latch is closed.

3. An electrically operated fluid fuel burner control included in the electric circuit operating the fuel feeding motor, said control including a motor switch, a holding magnet, both connected in series in the circuit between the motor and source of electricity, and an ignition device having a switch connected in parallel with the motor, a reset latch for manually closing the motor switch and automatic means actuated upon failure of the burner flame to release the motor switch latch, thermally actuated means responsive to the presence or absence of the burner flame, which when cold allows the ignition switch to close, sets the automatic means in active relation, and cooperates with the reset latch to allow a manual closing of the motor switch, means actuated by the energization of the holding magnet cooperating with the closed latch to hold the motor switch in closed position, said thermally actuated means when heated by the burner flame opens the ignition switch and renders the automatic means inactive, and locking means actuated by the energization of the holding magnet for holding the ignition switch open until the holding magnet is deenergized, whereby upon the normal closing of the motor circuit with the motor switch closed and with the ignition switch normally closed, the holding magnet will be energized and should the burner flame, after a predetermined time, fail to ignite, the automatic means is actuated to release the latch to open the motor switch and stop the motor.

4. An electrically operated fluid fuel burner control included in the electric circuit operating the fuel feeding motor, said control including a motor switch, a holding magnet both connected in series in the circuit between the motor and source of electricity, and an ignition device having a switch connected in parallel with the motor, a reset latch for manually closing the motor switch and automatic means actuated by failure of the burner flame to release the motor switch latch, thermally actuated means responsive to the presence or absence of the burner flame, which when cold allows the ignition switch to close, sets the automatic means in active relation, and cooperates with the reset latch to allow a manual closing of the motor switch, means actuated by the energization of the holding magnet cooperating with the closed latch to hold the motor switch in closed position, said thermally actuated means when heated by the burner flame opens the ignition switch and renders the automatic means inactive, and locking means actuated by the energization of the holding magnet for holding the ignition switch open until the holding magnet is deenergized, whereby upon the normal closing of the motor circuit with the motor switch closed and with the ignition switch normally closed, the holding magnet will be energized and should the burner flame, after a predetermined time, fail to ignite, the automatic means is actuated to release the latch to open the motor switch and stop the motor, thereafter the thermally actuated means cools and in cooling returns the motor switch to a position to cooperate with the latch for a manual reset to the normal closed position.

5. An electrically operated fluid fuel burner control included in the electric circuit operating the fuel feeding motor, said control including a motor switch, and a holding magnet, both connected in series in the circuit between the motor and source of electricity, and an ignition device having a switch connected in parallel with the motor, a reset latch for manually closing the motor switch, and automatic means actuated by failure of the burner flame to release the motor switch latch, thermally actuated means responsive to the presence or absence of the burner flame, which when cold allows the ignition switch to close, sets the automatic means in active relation, and cooperates with the reset latch to allow a manual closing of the motor switch, means actuated by the energization of the holding magnet cooperating with the closed latch to hold the motor switch in closed position, said thermally actuated means when heated by the burner flame opens the ignition switch and renders the automatic means inactive, and locking means actuated by the energization of the holding magnet for holding the ignition switch open until the holding magnet is deenergized, whereby upon the normal closing of the motor circuit with the motor switch closed and with the ignition switch normally closed the holding magnet will be energized, so that upon the ignition of the burner flame the thermostatically actuated means responsive thereto opens the ignition switch and renders the automatic means inactive, and thereafter should the burner flame fail or become extinguished, the said thermally actuated means cools causing the automatic means to operate, after a predetermined time, to release the motor switch to open and deenergize the holding magnet whereby, the holding magnet having locked the ignition switch after being normally opened by the thermally actuated means, it remains open until the motor switch is opened, preventing a premature ignition should fuel be supplied after the failure of the flame and before the motor switch opens.

6. An electrically operated fluid fuel burner control included in the electric circuit operating the fuel feeding motor, said control including a motor switch, and a holding magnet both connected in series in the circuit between the motor and source of electricity, and an ignition device having a switch connected in parallel with the motor, a reset latch for manually closing the motor switch and automatic means actuated by failure of the burner flame to open the motor switch, thermally actuated means responsive to the presence or absence of the burner flame, which when cold allows the ignition switch to close, sets the automatic means in active relation, said means cooperating when cold with the reset latch to allow a manual closing of the motor switch, means actuated by the energization of the holding magnet cooperating with the closed latch to hold the motor switch in closed position, said thermally actuated means when heated by the burner flame opens the ignition switch and renders the automatic means inactive, and locking the automatic means inactive, and locking means actuated by the energization of the holding magnet, for holding the ignition switch open until the holding magnet is deenergized, whereby upon the normal closing of the motor circuit with the motor switch closed and with the ignition switch normally closed the holding magnet will be energized so that upon the ignition of the burner flame the thermostatically actuated means responsive thereto opens the ignition switch and renders the automatic means inactive, and thereafter should the burner flame fail or become extinguished, the said thermally actuated means cools causing the automatic means to operate, after a predetermined time, to release the motor switch to open and deenergize the holding magnet, whereby the holding magnet having locked the ignition switch after being normally opened by the thermally actuated means, holds it locked open until the motor switch is opened, preventing a premature ignition should fuel be supplied after the failure of the flame and before the motor switch opens and the motor thereafter remains inoperative until the thermally actuated means cools and allows the motor switch to be manually reset by the latch.

7. An electrically operated fluid fuel burner control included in the electric circuit operating the fuel feeding motor, said control including a motor switch, a heat coil, and a holding magnet all connected in series in the circuit between the motor and source of electricity, a shunt switch connected in series with the motor on each side of the heat coil, and an ignition device having a switch connected in parallel with the motor, a reset latch for manually closing the motor switch, thermally actuated means responsive to the presence or absence of the burner flame, which when cold allows the ignition switch to close, opens the shunt switch and cooperates with the reset latch to allow a manual closing of the motor switch, thermostatic means for releasably holding the latch upon the closing of the motor switch, actuated by the energization of the heat coil to release the latch to open the motor switch, means actuated by the energization of the holding magnet cooperating with the closed latch to hold the motor switch in closed position, said thermally actuated means when heated by the burner flame opens the ignition switch and closes the shunt switch, and locking means actuated by the energization of the holding magnet for holding the ignition switch open until the holding magnet is deenergized.

8. An electrically operated fluid fuel burner control included in the electric circuit operating the fuel feeding motor, said control including a motor switch, a heat coil, and a holding magnet all connected in series in the circuit between the motor and source of electricity, a shunt switch connected in series with the motor on each side of the heat coil, and an ignition device having a switch connected in parallel with the motor, a reset latch for manually closing the motor switch, thermally actuated means responsive to the presence or absence of the burner flame, which when cold allows the ignition switch to close, opens the shunt switch and cooperates with the reset latch to allow a manual closing of the motor switch, thermostatic means for releasably holding the latch upon the manual closing of the motor switch, actuated by the energization of the heat coil to release the latch to open the motor switch, means actuated by the energization of the holding magnet cooperating with the closed latch to hold the motor switch in closed position, said thermally actuated means when heated by the burner flame opens the ignition switch and closes the shunt switch, and locking means actuated by the energization of the holding magnet for holding the ignition switch open until the holding magnet is deenergized, said thermally actuated means responsive to the burner flame cools after the breaking of the motor circuit and, in assuming its cold position, gradually allows the ignition switch to close and causes the shunt switch to open.

9. An electrically operated fluid fuel burner control included in the electric circuit operating the fuel feeding motor, said control including a motor switch, a heat coil, and a holding magnet all connected in series in the circuit between the motor and source of electricity, a shunt switch connected in series with the motor on each side of the heat coil, and an ignition device having a switch connected in parallel with the motor, a reset latch for manually closing the motor switch, thermally actuated means responsive to the presence or absence of the burner flame, which when cold allows the ignition switch to close, opens the shunt switch and cooperates with the reset latch to allow a manual closing of the motor switch, thermostatic means for releasably holding the latch upon the manual closing of the motor switch actuated by the energization of the heat coil to release the latch to open the motor switch, means actuated by the energization of the holding magnet cooperating with the closed latch to hold the motor switch in closed position, said thermally actuated means when heated by the burner flame opens the ignition switch and closes the shunt switch, and locking means actuated by the energization of the holding magnet for holding the ignition switch open until the holding magnet is deenergized, whereby upon the normal closing of the motor circuit with the motor switch closed, with the shunt switch normally open and with the ignition switch normally closed, the holding magnet will be energized so that should the burner flame fail to ignite the shunt switch remains open and the energizing of the heat coil, after a predetermined time, actuates the thermostatic means to release the latch to open the motor switch and stop the motor.

10. An electrically operated fluid fuel burner control included in the electric circuit operating the fuel feeding motor, said control including a motor switch, a heat coil, and a holding magnet all connected in series in the circuit between the motor and source of electricity, a shunt switch connected in series with the motor on each side of the heat coil, and an ignition device having a switch connected in parallel with the motor, a reset latch for manually closing the motor switch, thermally actuated means responsive to the presence or absence of the burner flame, which when cold allows the ignition switch to close, opens the shunt switch and cooperates with the reset latch to allow a manual closing of the motor switch, thermostatic means for releasably holding the latch upon the manual closing of the motor switch actuated by the energization of the heat coil to release the latch to open the motor switch, means actuated by the energization of the holding magnet cooperating with the closed latch to hold the motor circuit in closed position, said thermally actuated means when heated by he burner flame opening the ignition switch and closing the shunt switch, and locking means actuated by the energization of the holding magnet for holding the ignition switch open until the holding magnet is deenergized, whereby upon the normal closing of the motor circuit with the motor switch closed, with the shunt switch normally open and with the ignition switch normally closed, the holding magnet will be energized so that upon the ignition of the burner flame the thermostatically actuated means responsive thereto opens the ignition switch and closes the shunt switch shunting out the heat coil, and thereafter should the burner flame fail or become extinguished, the said thermally actuated means cools causing the shunt switch to open, whereupon, after a predetermined time, the latch releases the motor switch to open and deenergizes the holding magnet, whereby the holding magnet having locked the ignition switch after being normally opened by the thermally actuated means holds it locked open until the motor switch is opened preventing a premature ignition should fuel be supplied after the failure of the flame and before the motor switch is released to open.

11. An electrically operated fluid fuel burner control included in the electric circuit operating the fuel feeding motor, said control including a pivotally mounted motor switch, and a holding magnet connected in series in the circuit between the motor and source of electricity, and an ignition device having a pivotally mounted ignition switch connected in parallel with the motor, thermally actuated means responsive to the presence or absence of the burner flame, means thereon which when said thermal means is cold allows the ignition switch to swing into closed position, said means engaging a portion of the motor switch mounting to close the motor switch, means actuated by the energization of the holding magnet cooperating with said mounting to hold the motor switch in closed position, said means upon the thermally actuated means when said thermal means is heated by the burner flame, engaging and swinging the mounting of the ignition switch to open the switch and passing out of engagement with the motor switch mounting, and locking means actuated by the energization of the holding magnet for engaging the mountings of both switches for holding the ignition switch open and the motor switch closed until the holding magnet is deenergized, whereupon the motor switch swings to open position, said thermally actuated means responsive to the burner flame cools after the breaking of the motor circuit and, in assuming its cold position, gradually, said means thereon moves out of engagement with the ignition switch mounting and allows the ignition switch to close, at the same time said means engages the motor switch mounting and swings the motor switch to closed position.

12. An electrically operated fluid fuel burner control included in the electric circuit operating the fuel feeding motor, a thermostatic switch in the motor circuit for normally opening and closing the circuit through the control, said control including a pivotally mounted motor switch, and a holding magnet connected in series in the circuit between the motor and source of electricity, and an ignition device having a pivotally mounted ignition switch connected in parallel with the motor, thermally actuated means responsive to the presence or absence of the burner flame, means thereon which when said thermal means is cold allows the ignition switch to swing into closed position, said means engaging a portion of the motor switch mounting to close the motor switch, means actuated by the energization of the holding magnet cooperating with said mounting to hold the motor switch in closed position, said means upon the thermally actuated means when said thermal means is heated by the burner flame, engaging and swinging the mounting of the ignition switch to open the switch and passing out of engagement with the motor switch mounting, and locking means actuated by the energization of the holding magnet for engaging the mountings of both switches for holding the ignition switch open and the motor switch closed until the holding magnet is deenergized, whereupon the motor switch swings to open position, said thermally actuated means responsive to the burner flame cools after the breaking of the motor circuit and, in assuming its cold position, gradually, said means thereon moves out of engagement with the ignition switch mounting and allows the ignition switch to close, at the same time said means engages the motor switch mounting and swings the motor switch to closed position.

13. An electrically operated fluid fuel burner control included in the electric circuit operating the fuel feeding motor, said control including a pivotally mounted motor switch, an electrically actuated release for normally holding the motor switch closed, and a holding magnet connected in series in the circuit between the motor and source of electricity, a pivotally mounted shunt switch connected in series with the motor on each side of the release, and an ignition device having a pivotally mounted ignition switch connected in parallel with the motor, thermally actuated means responsive to the presence or absence of the burner flame, means thereon which when said thermal means is cold allows the ignition switch to swing into closed position, engages and swings the mounting of the shunt switch to open position and swings the motor switch to closed position, means actuated by the energization of the holding magnet cooperating with the motor switch mounting to hold the switch in closed position, said thermally actuated means when heated by the burner flame actuates the said means thereon to engage the mountings of the ignition and shunt switches to open the ignition switch and to close the shunt switch, and locking means actuated by the energization of the holding magnet for engaging the mountings of the ignition and motor switches to hold the ignition switch open and the motor switch closed until the holding magnet is deenergized, whereby upon the normal closing of the motor circuit with the motor switch closed, with the shunt switch normally open and with the ignition switch normally closed, the holding magnet will be energized and should the burner flame fail to ignite the shunt switch remains open and actuates the release, after a predetermined time, to open the motor switch and stop the motor.

14. An electrically operated fluid fuel burner control included in the electric circuit operating the fuel feeding motor, a thermostatic switch in the motor circuit for normally opening and closing the circuit through the control, said control including a pivotally mounted motor switch, an electrically actuated release for normally holding the motor switch closed, and a holding magnet connected in series in the circuit between the motor and source of electricity, a pivotally mounted shunt switch connected in series with the motor on each side of the release, and an ignition device having a pivotally mounted ignition switch connected in parallel with the motor, thermally actuated means responsive to the presence or absence of the burner flame, means thereon which when said thermal means is cold allows the ignition switch to swing into closed position, engages and swings the mounting of the shunt switch to open position and swings the motor switch to closed position, means actuated by the energization of the holding magnet cooperating with the motor switch mounting to hold the switch in closed position, said thermally actuated means when heated by the burner flame actuates the said means thereon to engage the mountings of the ignition and shunt switches to open the ignition switch and to close the shunt switch, and locking means actuated by the energization of the holding magnet for engaging the mountings of the ignition and motor switches to hold the ignition switch open and the motor switch closed until the holding magnet is deenergized, whereby upon the normal closing of the motor circuit with the motor switch closed, with the shunt switch normally open and with the ignition switch normally closed, the holding magnet will be energized and should the burner flame fail to ignite the shunt switch remains open and actuates the release, after a predetermined time, to open the motor switch and stop the motor.

15. An electrically operated fluid fuel burner control included in the electric circuit operating the fuel feeding motor, said control including a pivotally mounted motor switch, an electrically actuated release for normally holding the motor switch closed, and a holding magnet all connected in series in the circuit between the motor and source of electricity, a shunt switch connected in series with the motor on each side of the release, and an ignition device having a pivotally mounted ignition switch connected in parallel with the motor, thermally actuated means responsive to the presence or absence of the burner flame, means thereon which when said thermal means is cold allows the ignition switch to swing into closed position, engages and swings the mounting of the shunt switch to open position and swings the motor switch to closed position, said thermally actuated means when heated by the burner flame actuating said means thereon to engage the mountings of the ignition and shunt switches to open the ignition switch and to close the shunt switch and locking means actuated by the energization of the holding magnet for engaging the mountings of the ignition and motor switches to hold the ignition switch open and the motor switch closed until the holding magnet is deenergized, whereby upon the normal closing of the motor circuit with the motor switch closed, with the shunt switch normally open and with the ignition switch normally closed, the holding magnet will be energized and upon the ignition of the burner flame the means upon the thermostatically actuated means responsive thereto moves into engagement with the ignition switch mounting and opens said switch and, at the same time, closes the shunt switch shunting out the release and thereafter should the burner flame fail or become extinguished, the said thermally actuated means cools causing the shunt switch to open, whereupon, after a predetermined time, the motor circuit actuates the release to open the motor switch and deenergize the holding magnet, whereby the holding magnet having locked the ignition switch after being normally opened by the thermally actuated means, holds it open until the motor switch is opened preventing a premature ignition should fuel be supplied between the time of the failure of the flame and the opening of the motor switch.

16. An electrically operated fluid fuel burner control included in the electric circuit operating the fuel feeding motor, a thermostatic switch in the motor circuit for normally opening and closing the circuit through the control, said control including a pivotally mounted motor switch, an electrically actuated release for normally holding the motor switch closed, and a holding magnet all connected in series in the circuit between the motor and source of electricity, a shunt switch connected in series with the motor on each side of the release, and an ignition device having a pivotally mounted ignition switch connected in parallel with the motor, thermally actuated means responsive to the presence or absence of the burner flame, means thereon which when said thermal means is cold allows the ignition switch to swing into closed position, engages and swings the mounting of the shunt switch to open position and swings the motor switch to closed position, said thermally actuated means when heated by the burner flame actuating said means thereon to engage the mountings of the ignition and shunt switches to open the ignition switch and to close the shunt switch and locking means actuated by the energization of the holding magnet for engaging the mountings of the ignition and motor switches to hold the ignition switch open and the motor switch closed until the holding magnet is deenergized, whereby upon the normal closing of the motor circuit with the motor switch closed with the shunt switch normally open and with the ignition switch normally closed, the holding magnet will be energized and upon the ignition of the burner flame the means upon the thermostatically actuated means responsive thereto moves into engagement with the ignition switch mounting and opens said switch and, at the same time, closes the shunt switch shunting out the release, and thereafter should the burner flame fail or become extinguished, the said thermally actuated means cools causing the shunt switch to open, whereupon, after a predetermined time, the motor circuit actuates the release to open the motor switch and deenergize the holding magnet, whereby the holding magnet having locked the ignition switch after being normally opened by the thermally actuated means, holds it open until the motor switch is opened preventing a premature ignition should fuel be supplied between the time of the failure of the flame and the opening of the motor switch.

IRA E. McCABE.